United States Patent Office 2,957,884
Patented Oct. 25, 1960

2,957,884
ANTHRAQUINONE VAT DYESTUFFS

Eduard Moergeli, Muttenz, Switzerland, assignor to Ciba Limited, Basel, Switzerland No Drawing. Filed Dec. 2, 1957, Ser. No. 699,897

Claims priority, application Switzerland, Dec. 12, 1956

1 Claim. (Cl. 260—307.5)

This invention provides anthraquinone vat dyestuffs of the formula $$A_1—X—A_2$$

in which $A_1$ and $A_2$ represent vattable radicals of which at least one contains a hexahydrobenzoylamino group, and X represents a direct bond or a bridge atom or an organic radical.

The two vattable radicals $A_1$ and $A_2$ may be identical or different from each other. As such radicals there may be mentioned more especially anthraquinone radicals, of which at least one contains a hexahydrobenzoylamino group. In addition to the hexahydrobenzoylamino group the anthraquinone radicals may contain further substituents, especially heterocyclic rings, for example, an oxazole or thiazole ring.

In the simplest case X in the above formula represents a direct bond, for example, the bond connecting a ring carbon atom of an anthraquinone nucleus to a ring carbon atom of another anthraquinone nucleus or to a ring of a heterocyclic ring fused on to the anthraquinone nucleus, as is the case, for example, in 1-amino-4-hexahydrobenzoylamino - 2:2' - (5':6' - phthaloyl) - benzthiazolyl-anthraquinone. Alternatively, X may be a bridge member, for example, an —O— or —S— atom or an —NH— group. Especially valuable are those dyestuffs in which X represents a heterocyclic radical. The heterocyclic radical may be bound to the anthraquinone nuclei directly as, for example, in the case of bis-[1'-(amino-4-hexahydrobenzoylamino) - 2' - anthraquinonyl]-2:5-oxdiazole.

As an example of a vattable aromatic radical there may be mentioned that of the formula

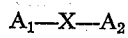

At least one of the radicals $A_1$ and $A_2$ contains a hexahydrobenzoylamino group, and, when one of these radicals contains no hexahydrobenzoylamino group, it may contain a benzoylamino group. The term "hexahydrobenzoylamino group" includes principally the radical of the amide of hexahydrobenzoic acid itself, but also includes the simple nuclear substitution products thereof, for example, para-methylhexahydrobenzoic acid.

The invention also includes a process for the manufacture of the anthraquinone vat dyestuffs of the above formula $A_1—X—A_2$, wherein at any stage in the manufacture of the dyestuff a vattable amine is acylated with a hexahydrobenzoic acid or a functional derivative thereof.

In many cases it is of advantage to introduce the hexahydrobenzyl radical in the first stage of the process, for example, by the partial acylation of a diaminoanthraquinone, especially 1:4- or 1:5-diaminoanthraquinone, to form the monohexahydrobenzoyl-diamino compound, and the reaction of two molecular proportions of the latter compound with one molecular proportion of an arylcompound containing two exchangeable halogen atoms, for example, a dihalogen-aryl-compound, and especially a vattable dihalogen-compound, for example, a dihalogenanthraquinone, such as 1:4-, 1:5-, 2:6- or 2:7-dichloranthraquinone or dibromanthrone. As compounds containing two exchangeable halogen atoms, reactive derivatives of dicarboxylic acids, especially acid chlorides thereof, may be reacted with monohexahydrobenzoyldiaminoanthraquinones to produce acid amide formation on both sides, and as such dicarboxylic acid derivatives there may be mentioned more especially the halides of isophthalic acid, terephthalic acid, azobenzene- dicarboxylic acid or azodiphenyl-dicarboxylic acid.

In other cases it is of advantage to introduce the hexahydrobenzoyl radical in the last stage, especially in the case of dyestuffs of the type

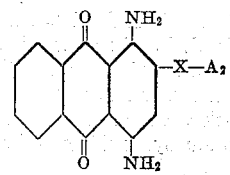

in which X and $A_2$ have the meanings given above. Under the usual conditions of acylation such compounds are acylated only at the amino group in the 4-position.

The compounds of this invention are valuable vat dyestuffs which are suitable for dyeing a very wide variety of materials particularly fibers from natural and regenerated cellulose, or are suitable as pigments. Dyeings produced with these dyestuffs are distinguished by their good properties of fastness. A further advantage of the new dyestuffs is that they dye natural cellulose and regenerated cellulose the same tints. As compared with analogous known dyestuffs which contain the benzoyl radical instead of the hexahydrobenzoyl radical, the new dyestuffs are distinguished by their better levelling capacity.

The following example illustrate the invention, the parts and percentages being by weight unless otherwise stated and the relationship of parts by weight to parts by volume being the same as that of the kilogram to the liter.

Example 1

A mixture of 5 parts of 1:4 - diamino - 2:2'- (5':6'-phthaloyl)-benzthiazolyl-anthraquinone, 5 parts of hexahydrobenzoyl chloride, 3 parts of pyridine and 120 parts of nitrobenzene is heated to 150–155° C. while stirring, and stirring is continued at that temperature until the reaction to form the monohexahydrobenzoylamino-compound ceases. The dyestuff is filtered off at 100° C., and washed with alcohol and dried. From a violet vat it dyes fibers very level, fast, reddish blue tints. It corresponds to the formula

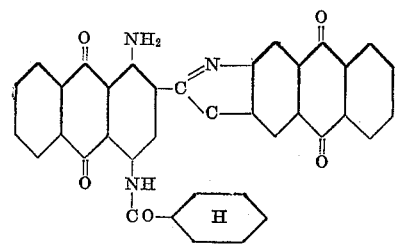

Example 2

A mixture of 3.2 parts of 1:4-diamino-2:2'-(5':6'-phthaloyl) - benzoxazolyl - anthraquinone, 3.2 parts of hexahydro-p-toluene sulfonic acid chloride (boiling point 73–74° C. under 11 mm. pressure) prepared from liquid hexahydro-p-toluyl acid and thionyl chloride, 2 parts of pyridine and 110 parts of nitrobenzene is stirred from 1 to 2 hours at 150 to 155° C. The dyestuff crystallised in unitary, blue-grey needles is filtered at 100° C., washed with alcohol and dried. From a black-blue vat it dyes fibers level, reddish blue tints and corresponds to the formula

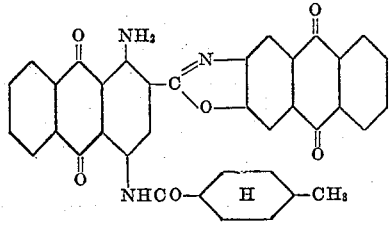

If instead of hexahydro-p-toluyl acid chloride an equivalent quantity of hexahydro-benzoyl chloride is used, a similar dyestuff is obtained.

*Example 3*

1 part of the dyestuff obtained as described in Example 1 is vatted at 45° C. in 100 parts of water with 2 parts of sodium hydrosulfite with the addition of 4 parts by volume of sodium hydroxide solution of 30% strength. The resulting stock vat is added to a solution of 4 parts by volume of sodium hydroxide solution of 30% strength and 2 parts of sodium hydrosulfite in 2000 parts of water. 100 parts of cotton are dyed in the resulting dyebath for one hour at 40–50° C. with the addition of 10 parts of sodium chloride. The cotton is then squeezed, oxidised in the air, rinsed, acidified, again rinsed, and soaped at the boil. It is dyed a reddish blue tint, and the dyeing has excellent properties of fastness.

What is claimed is:

The dyestuff of the formula

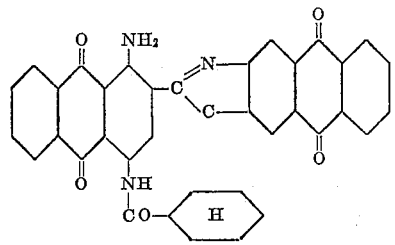

References Cited in the file of this patent

UNITED STATES PATENTS

| | | |
|---|---|---|
| 1,880,440 | Heidenreich | Oct. 4, 1932 |
| 2,095,468 | Fleischhauer et al. | Oct. 12, 1937 |
| 2,147,569 | Berthold et al. | Feb. 14, 1939 |
| 2,228,455 | Honold et al. | Jan. 14, 1941 |
| 2,629,718 | Belshaw et al. | Feb. 24, 1953 |

FOREIGN PATENTS

| | | |
|---|---|---|
| 696,423 | Germany | Sept. 20, 1940 |

UNITED STATES PATENT OFFICE
CERTIFICATION OF CORRECTION

Patent No. 2,957,884

October 25, 1960

Eduard Moergeli

It is hereby certified that error appears in the above numbered patent requiring correction and that the said Letters Patent should read as corrected below.

Column 1, lines 48 to 54, the formula should appear as shown below instead of as in the patent:

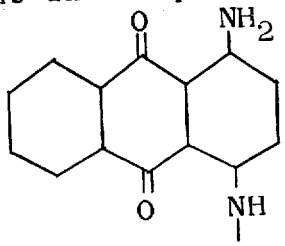

column 2, lines 60 to 65, the right-hand portion of the formula should appear as shown below instead of as in the patent:

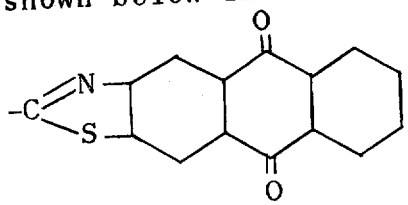

column 4, lines 10 to 16, the right-hand portion of the formula should appear as shown below instead of as in the patent:

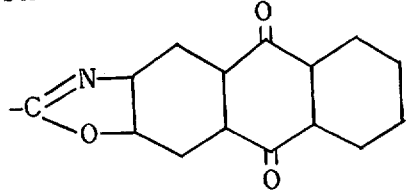

Signed and sealed this 1st day of August 1961.

(SEAL)
Attest:

ERNEST W. SWIDER
Attesting Officer

DAVID L. LADD
Commissioner of Patents